April 14, 1959     J. S. ROBBINS     2,881,582
CABLE SPREADING TOOL
Filed April 4, 1956

INVENTOR
James S. Robbins
BY *Robert M. Dunning*
ATTORNEY

United States Patent Office 2,881,582
Patented Apr. 14, 1959

2,881,582

CABLE SPREADING TOOL

James S. Robbins, St. Paul, Minn.

Application April 4, 1956, Serial No. 576,183

3 Claims. (Cl. 57—3.5)

This invention relates to an improvement in cable spreading tools and deals particularly with an apparatus capable of spreading apart the various strands of a wire rope cable for any desired purpose.

In some instances it has been found desirable to spread the various strands of a wire rope cable. A cable of this type usually includes a central core and a series of spirally wound strands encircling this core. The strands usually include a number of individual wires spirally wound together. In view of the fact that the strands are usually preformed so as to tightly encircle the cable core, considerable difficulty is experienced in spreading the various strands apart. This becomes a particular problem where it is desired to spread the strands to temporarily expose the core of the cable throughout the entire length thereof.

For example, a certain type of conveyor has recently been produced which includes a pair of wire rope cables which act to support a flexible conveyor belt. Connecting means are provided at equal intervals throughout the length of the cable which serve to connect each cable to a corresponding edge of the belt. In order to avoid the use of a connector having a band encircling the outer surface of the cable which acts to interfere to some extent with the passage of the cable over supporting sheaves, it has been found preferable to provide on the various connecting means an element which encircles the cable core and which extends between certain of the cable strands to accomplish this result. In order to accomplish this result, it is necessary to space the strands of the cable apart to expose the core. While the present structure is not limited to a use of this type, the apparatus has been found particularly useful for this purpose.

An object of the present invention lies in the provision of a cable spreading device which is designed to encircle the core of the cable and to have a hub provided with external spiral grooves designed to accommodate the various strands of the cable. The hub of the device is of proper size to space the various cable strands so that a portion of the cable core on each side of the hub of the apparatus is exposed. As the hub holds the various strands spaced, the various core attaching devices can be inserted between the strands in a desired location to extend from the cable in a predetermined angular relation.

A feature of the present invention resides in the provision of a cable spreading device including a series of radially extending spokes which preferably extend from the hub of the apparatus between each pair of spaced strands. These spokes may be used to rotate the hub. As the strands of the cable extend through spiral grooves in the exterior surface of the hub, rotation of the hub moves the cable spreading device longitudinally of the cable, the hub holding the strands spaced from the core for a short distance on either side of the hub. By rotating the apparatus in one direction, the spreading device may be moved from one end of the cable to the other.

A further feature of the present invention resides in the provision of a cable spreading device which may be used to spread any portion of a cable either starting at an end thereof or starting at an intermediate point thereof. The hub of the apparatus is split so that it may be inserted about the core of the cable if the various encircling strands are spread apart initially to permit the insertion of the two parts of the hub. Once the hub has been inserted within the spread portions of the encircling strands, these strands are placed in the angularly spaced spiral grooves in the surface of the hub. If convenient, the reinforcing ring which reinforces the spokes is applied over an end of the cable and the various spokes are inserted through this ring and into the hub. In the event the end of the cable is not readily accessible, the outer reinforcing ring can be split or can be omitted.

These and other objects and novel features of the present invention will be more clearly and fully set forth in the following specification and claims.

In the drawings forming a part of the specification:

Figure 1:
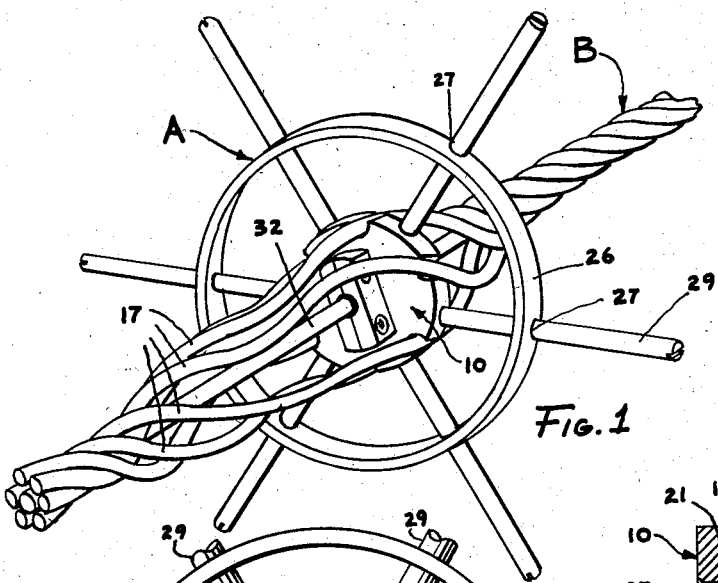
Figure 1 is a perspective view of the cable spreading apparatus in operation.

The apparatus is shown in operation in Figure 1 of the drawings and is indicated in general by the letter A. The spreading device A is used in spreading the wire rope cable such as B.

The spreading device includes a hub which is indicated in general by the numeral 10 and which is composed of two substantially similar hub sections 11 and 12. The hub sections form a structure which is substantially cylindrical having parallel sides 13 and 14 and a cylindrical outer surface 15. This cylindrical outer surface 15 is provided with a series of angularly spaced spiral grooves 16. The grooves 16 are spiral so as to readily accommodate the various outer strands such as 17 of the cable B.

The two hub sections 11 and 12 are semi-circular in cross section and have a parting line which extends along a plane through the axis of the hub. Lugs or projections are provided on the two sections, a surface of each lug extending flush with the parting line between the two sections. The lugs 19 project on opposite sides of the hub section 11 while similar lugs 20 project on opposite sides of the hub section 12. Set screws such as 21 extend through one of each pair of adjoining lugs and are threaded into the companion lug. These set screws 21 are preferably recessed into the lugs so as not to project from the surface thereof to any material extent.

Figure 2:
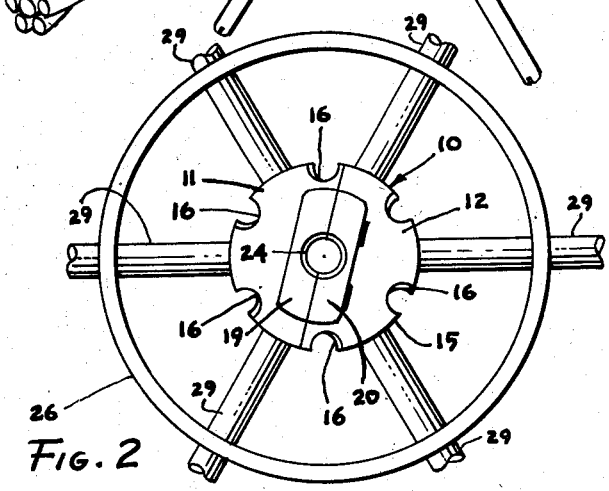
Figure 2 is a front elevational view of the cable spreading device, the spokes being shortened or broken off to permit the remainder of the structure to be shown in larger size.
Figure 4:
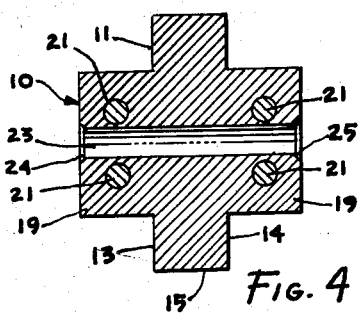
Figure 4 is a sectional view through the hub at a point parallel to and adjacent to the line of split between the two portions of the hub.
Figure 3:
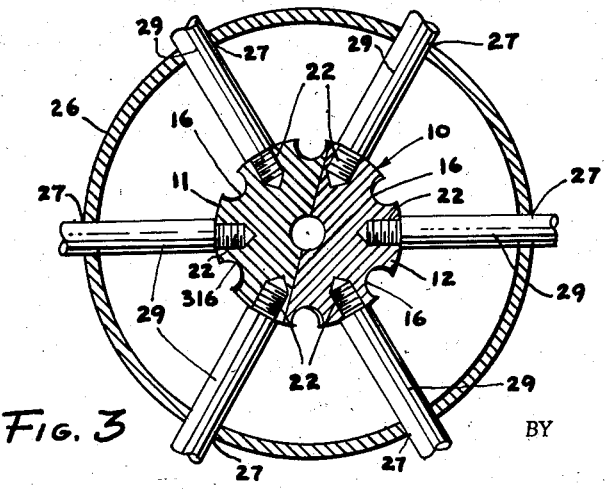
Figure 3 is a view similar to Figure 2 but showing a cross section through the apparatus.

The spiral grooves 16 are equal in number to the number of strands encircling the core of the wire rope cable. For example, if there are six such encircling strands, there are six notches 16 in the surface of the hub in equally spaced relation. Intermediate the notches 16, I provide internally threaded sockets such as 22 extending radially toward the axis of the hub. As is illustrated in the drawings, the sockets and the grooves 16 are arranged so that the sockets and grooves are completely within one portion or section of the hub. An axial opening 23 is provided extending through the axis of the hub and between the projecting lugs 19 and 20. This aperture 23 which is formed partially in each of the sections 11 and 12 is of proper dimensions to accommodate the core of the cable B. As is indicated in Figures 2 and 4 of the drawings, the ends 24 and 25 of the aperture 23 are tapered so as to simplify the insertion of the core to the central opening and to permit the core to slide freely through the central opening.

Figure 5:
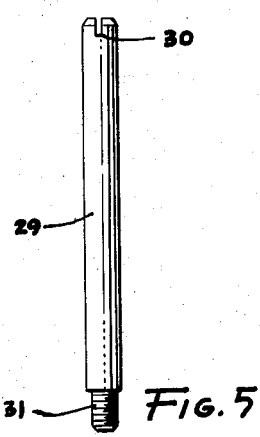
Figure 5 is an elevational view of one of these spokes removed from the remainder of the apparatus.

A spoke reinforcing ring 26 is arranged concentrically to the hub 12 and is of considerably larger diameter than the outer surface of the hub 10. This ring 26 is provided with radially extending angularly spaced apertures 27 therethrough which are aligned with the apertures or sockets 22 in the hub 10. These apertures 27 are designed to accommodate radially extending spokes 29 which are constructed as is best illustrated in Figure 5 of the drawings.

Each spoke 29 comprises an elongated rod of preferably cylindrical form and is provided at its outer extremity with a screwdriver slot 30. Alternatively, the spokes could be multisided so as to accommodate a wrench or similar tool which can be used in tightening the spokes in place. The other end of each spoke is provided with a reduced diameter portion 31 which is externally threaded. Each externally threaded end 31 is designed to fit into a corresponding socket 22 in the hub 10.

In operation, the hub 10 is first placed so as to encircle a portion of the core 32 of the cable B. This is accomplished by prying apart the various strands of the cable in a manner to expose a portion of the core either at the end of the cable or at an intermediate point thereupon. If the end of the core is exposed, the end of the core may be directly inserted through the axial passage 23 in the hub 10 and the various core encircling strands may be inserted into the angularly spaced grooves 16 in the outer surface of the hub. If the core is exposed at a point spaced from the end of the cable, the two sections 11 and 12 of the hub 10 are first taken apart and individually inserted between the outer strands 17 into core encircling position and the two parts are then secured together through the use of the clamping bolts 21.

When the various strands 17 have been inserted in their respective grooves 16 in the hub of the device, the reinforcing ring 26 may be placed to encircle the hub and the various spokes 29 may be inserted through the openings 27 in the ring and threaded into the sockets 22 in the hub sections 11 and 12. When all of the spokes have been inserted, the apparatus appears as is indicated in Figure 1 of the drawings.

While the cable is in the spread form illustrated in Figure 1 of the drawings, the core may be suitably treated or a cable attachment may be inserted between the cable strands to encircle or partially encircle the core of the cable. The spreading tool is then rotated in one direction. Rotation of the spreading means in one direction acts to move the spreading means in one direction toward one end of the cable, while rotation of the spreading device in the other direction moves the device toward the opposite end of the cable.

Thus it will be seen that once the spreading tool has been applied, it may be moved longitudinally of the cable throughout any desired length of the cable and the core may be treated, replaced, or a cable attachment may be applied to the cable. In the particular device for which the present apparatus was designed, an attachment is provided at desired intervals to the cable core by inserting the attachment between the spread outer strands to partially encircle the core. After the spreading device has been moved a short distance, the outer strands again tightly encircle the core and the anchoring portion of the attachment so that the attachment is firmly affixed to the cable.

In accordance with the patent statutes, I have described the principles of construction and operation of my cable spreading tool, and while I have endeavored to set forth the best embodiment thereof, I desire to have it understood that obvious changes may be made within the scope of the following claims without departing from the spirit of my invention.

I claim:

1. A cable spreading device for use in conjunction with a wire rope cable having a central core and a series of strands wound spirally about said core, the spreading device including a hub having an axial passage therethrough of proper size to accommodate a cable core, said hub including a series of angularly spaced grooves in the outer surface thereof equal in number to the strands of the cable encircling the core, said grooves being substantially equally spaced, said hub being split along a plane including the axis of the core, a reinforcing ring encircling said hub and concentric therewith, and a series of radially extending spokes extending through said ring and into said hub by means of which said hub may be rotated.

2. A cable spreading device for use in spreading a wire rope cable having a central core and a series of spirally wound strands encircling said core, the spreading device including a hub having an axial passage extending therethrough designed to accommodate the cable core, a series of angularly spaced grooves in the outer surface of said hub, said grooves being substantially evenly spaced and being equal in number to the number of strands in the cable encircling the core, a series of spokes extending radially from said hub, each spoke extending between adjacent grooves, and a spoke reinforcing ring concentric with said hub and through which said spokes engage.

3. The construction described in claim 2 and in which the hub is provided with radially extending internally threaded sockets into which said spokes extend.

References Cited in the file of this patent

UNITED STATES PATENTS

| 122,246 | Gray | Dec. 26, 1871 |
| 1,159,286 | Smith et al. | Nov. 2, 1915 |
| 2,216,189 | Ennis | Oct. 1, 1940 |
| 2,414,136 | Bodendieck | Jan. 14, 1947 |
| 2,455,490 | Hubbard | Dec. 7, 1948 |
| 2,484,055 | Shepard | Oct. 11, 1949 |

FOREIGN PATENTS

| 12,319 | Great Britain | Oct. 15, 1885 |